June 5, 1934.  B. L. QUARNSTROM  1,961,453
TUBE COUPLING
Filed May 25, 1932
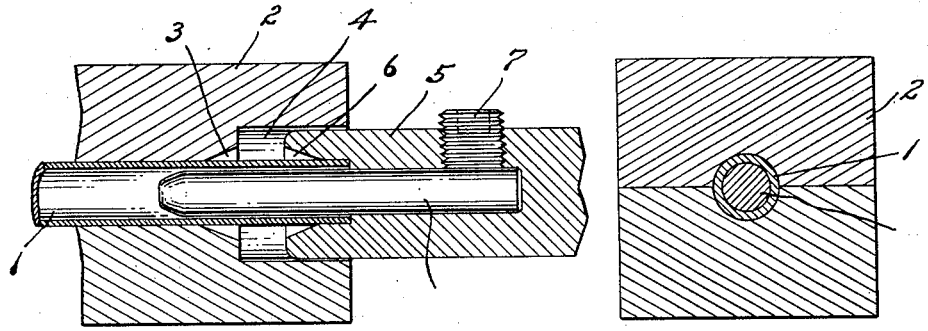
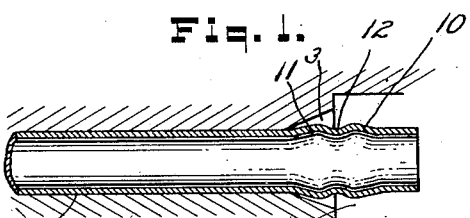
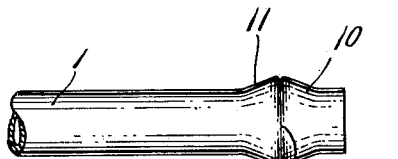
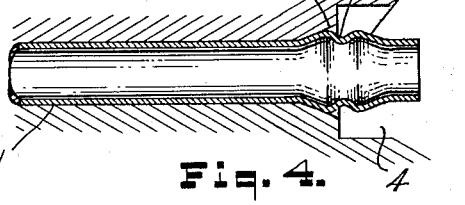
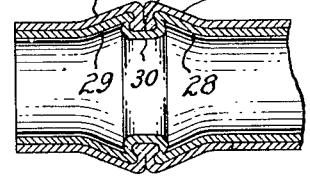
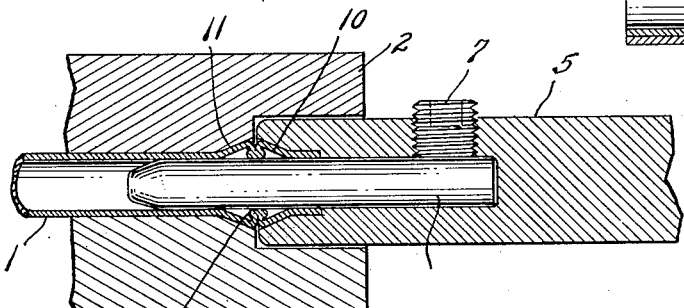
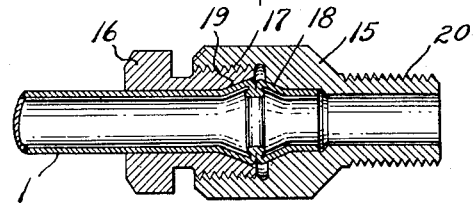
INVENTOR.
*Bert L. Quarnstrom.*
BY
*Barnes, Kisselle & Laughlin*
ATTORNEYS.

Patented June 5, 1934

1,961,453

UNITED STATES PATENT OFFICE 1,961,453

TUBE COUPLING

Bert L. Quarnstrom, Detroit, Mich., assignor to Bundy Tubing Company, Detroit, Mich., a corporation of Michigan Application May 25, 1932, Serial No. 613,569

1 Claim. (Cl. 137—75)

This invention has to do with the provision of a structure in a tube which facilitates coupling tube ends to any desirable piece of mechanism, or coupling two tube ends to each other. The invention is directed particularly toward a structure for use with coupling members of the type comprising the two parts usually screw threaded together and adapted to be drawn toward each other for attachment to the tube.

Heretofore, couplings of this type have been associated with a tube through the means of a sleeve placed over the tube and adapted to be squeezed from opposite sides by the two coupling members as the coupling members are screw threaded toward each other. The squeezing of the sleeve is designed to effect a seal with the coupling members and usually the sleeve and members have cooperating inclined surfaces so that the sleeve may be compressed or contracted around the tube to establish a more or less sealed joint against the tube walls.

The present invention aims to provide directly in the tube structure a formation suitable for the reception of coupling members of the type mentioned, to the elimination of a separate sleeve. More specifically, the invention contemplates throwing up a suitable formation in the tube wall, which formation is designed to cooperate with fitting members for direct engagement therewith for coupling purposes and for effecting a sealed connection.

In the accompanying drawing:

Fig. 1 is a sectional view taken through a die and punch construction for fashioning a tube and illustrating a tube in position to be operated upon.

Fig. 2 is a sectional view taken substantially on line 2—2 of Fig. 1.

Fig. 3 is an illustration of the tube showing how the wall is fashioned.

Fig. 4 is a similar sectional view showing further fashioning of the tube wall.

Fig. 5 is a sectional view illustrating the completed fashioning of the tube and showing the punch and die structure for accomplishing the same.

Fig. 6 is a side elevational view of a tube constructed in accordance with the invention.

Fig. 7 is a sectional view illustrating the application of fittings thereto.

Fig. 8 is a sectional view taken through a tube of double ply wall structure.

A suitable tube is illustrated at 1 and for fashioning its wall it may be placed in a die 2 which may comprise two parts, as illustrated in Fig. 2, to be clamped together in order to hold the tube against axial shift when it is worked upon. The die may have suitably formed inclined walls or a counter-sunk portion 3 opening into a socket 4. A punch is illustrated at 5 designed to fit into the socket 4 and it may have a recess for receiving the end of the tube, as shown, which recess may be enlarged with suitably shaped inclined walls 6. The end of the tube is designed to butt up against the bottom of the punch in the recess 5. A suitable pilot member 6 is carried by the punch and is designed to enter the tube as shown in Fig. 1, and this pilot may be held by a set screw 7.

To fashion the tube the punch and die are brought together with requisite force to throw up the metal of the tube walls. The pilot prevents inward collapse of the tube walls. Fig. 3 illustrates an early stage of the operation, the punch and die having been brought somewhat together and the tube wall may be distorted to form an outwardly inclined portion 10, another outwardly inclined portion 11, which portions are expanding into the countersunk portions 6 and 3 while a central portion 12 may remain substantially in place and may be prevented from inward collapse by the pilot. Fig. 4 shows the parts brought further together with the formations of the parts 10, 11 and 12 becoming more abrupt.

Fig 4 shows the final formation. The outwardly inclined part 10 may abut the wall of the recess 6 and be shaped thereby. Similarly, the outwardly inclined portion 11 may take its shape from the recess 3. The inwardly bent portion 12 may be positioned by the pilot, and the inwardly bent portion 12 may be constituted by a substantially closed fold in the metal. The finished tube may appear as illustrated in Fig. 6 where it will be noted that the inwardly folded part 12 is concealed from view, and substantially the only external appearance on the tube comprises the enlargement of inclined surfaces 10 and 11 divided by a fold line, as at 13.

A manner in which the tube may be used with couplings is illustrated in Fig. 7. In this figure the coupling comprises a part 15 which may be termed a fitting, and a part 16 which may be termed a nut. These are screw threaded together as at 17, one being on one side of the enlarged portion of the tube wall and one on the other, and the two members are designed to be drawn together so that at least one tightly engages an inclined wall of the tube. For this purpose each member may be suitably shaped with inclined walls as at 18 and 19 so that these walls may nicely abut the inclined parts 10 and 11 and establish a tight and sealed relation therewith. The fitting 15 may be secured to any device whether it be a tank, engine, another fitting, or any other part of a mechanism—or for that matter, to the end of another tube.

The invention is applicable to tubes having single ply walls or multi-ply walls. One example of a tube with a multi-ply wall to which the present invention is applicable is the tube of Patent #1,431,368. When this type of tube is fashioned to receive couplings, the finished tube may have the plies of its wall substantially in the form as illustrated in Fig. 8. The outer ply may present the inclined portions for contact with the fittings, as shown at 25 and 26, with an inwardly folded part 27. The inner ply may follow generally the internal shape of the outer ply having inclined inner parts 28 and 29, with its inwardly extending part 30 disposed around the part 27 substantially as shown. The outside appearance of a finished tube, whether it be single or multi-ply may be generally the same.

This structure eliminates the necessity of using a separate sleeve around the tube in conjunction with fittings of the type mentioned while at the same time provides inclined surfaces for effecting a sealing relation with the fitting parts. Moreover, a more effective seal is provided for the reason that the only place to have a surface to surface contact seal is between the walls of the fittings and the tube walls, whereas with a separate sleeve there is, of necessity, another surface to surface contact between the sleeve and the tube wall. Still further, the thrown-up wall formation of the tube may be located definitely a predetermined position from the end of the tube. This may be determined by the depth of the recess in the punch receiving the end of the tube, and the distance may be selected so as to substantially perfectly fit a coupling element. When a sleeve is used it will be appreciated that at times the sleeve may be nearer the end of the tube than at others, to the end that the end of the tube is not properly associated with a coupling element. Moreover, the invention serves to effectively hold the end of the tube in place and prevents its pulling away from anything to which it may be attached. It will be appreciated that it is not feasible without destroying the tube to pull it out from between the fittings attached as shown in Fig. 7, whereas, where a sleeve used, it is more feasible to dislodge the tube from the fittings by pulling it out of the sleeve.

I claim:

A tube structure for use with opposing fitting members comprising a tube wall having oppositely positioned outwardly flared portions substantially of frusto-conical shape and substantially meeting at their bases, the material of the tube wall substantially at the base of each frusto-conical shape extending inwardly of the tube, said inwardly extending portions being substantially in face to face contact and connected by a reverse bend in the metal which lies substantially in alignment with the tube wall whereby to form an internal circumferential reinforcing bead, said flared portions adapted to be engaged with force by opposite fitting members and the flared portions acting to set up a component of the force which tends to compress the walls of the tube and the internal reinforcing bead serving to reinforce the walls against collapse.

BERT L. QUARNSTROM.